UNITED STATES PATENT OFFICE.

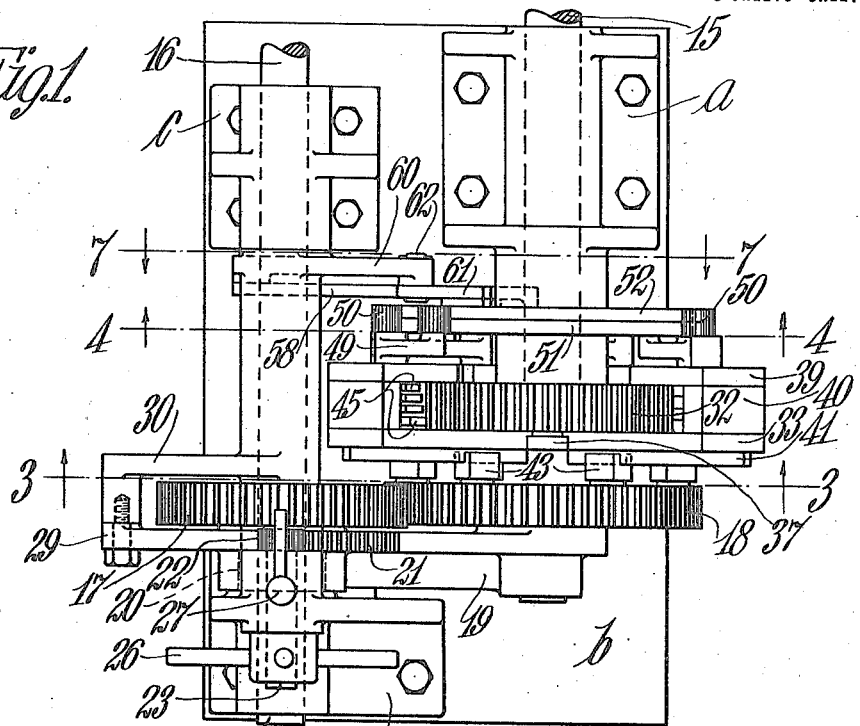

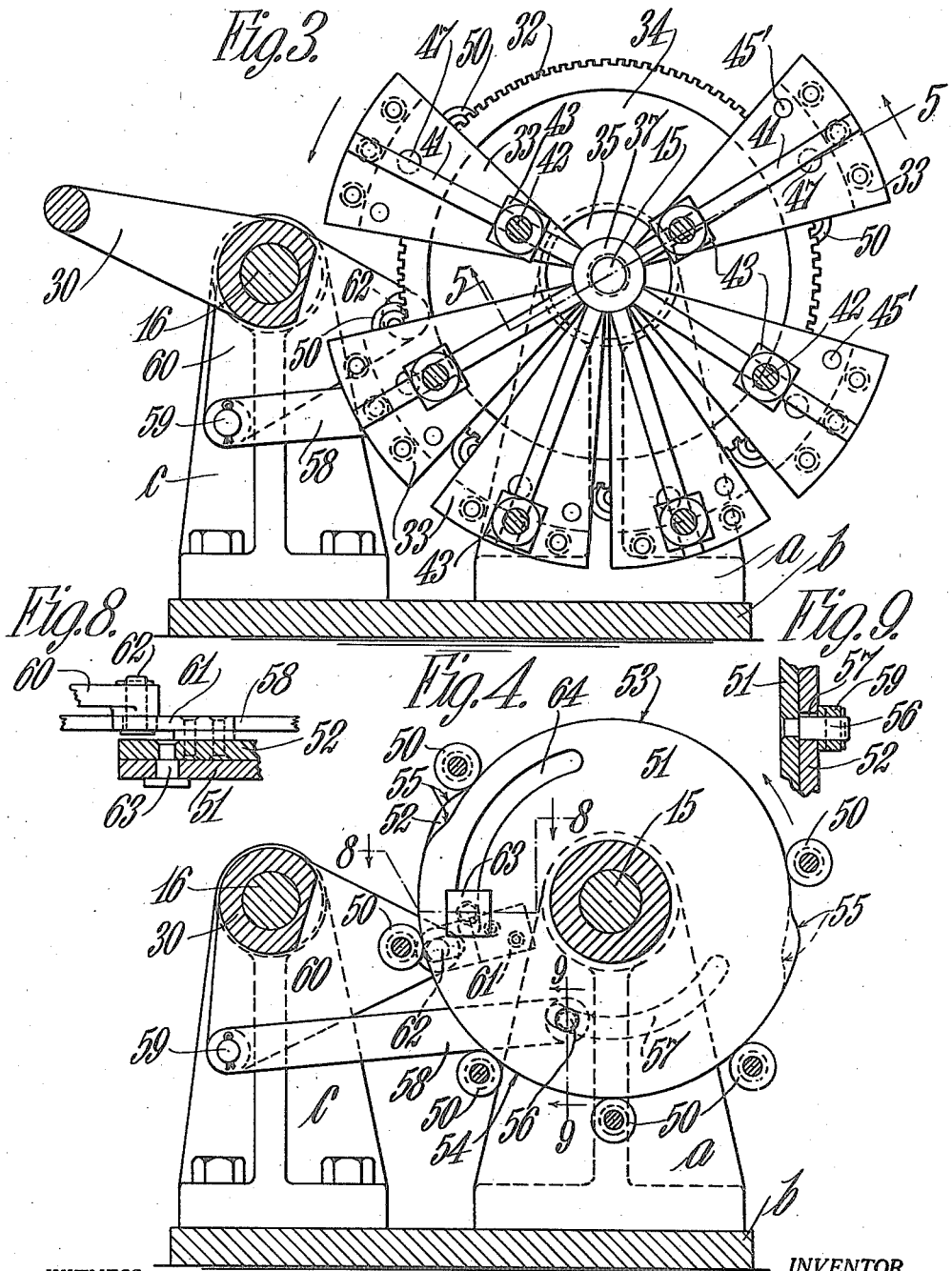

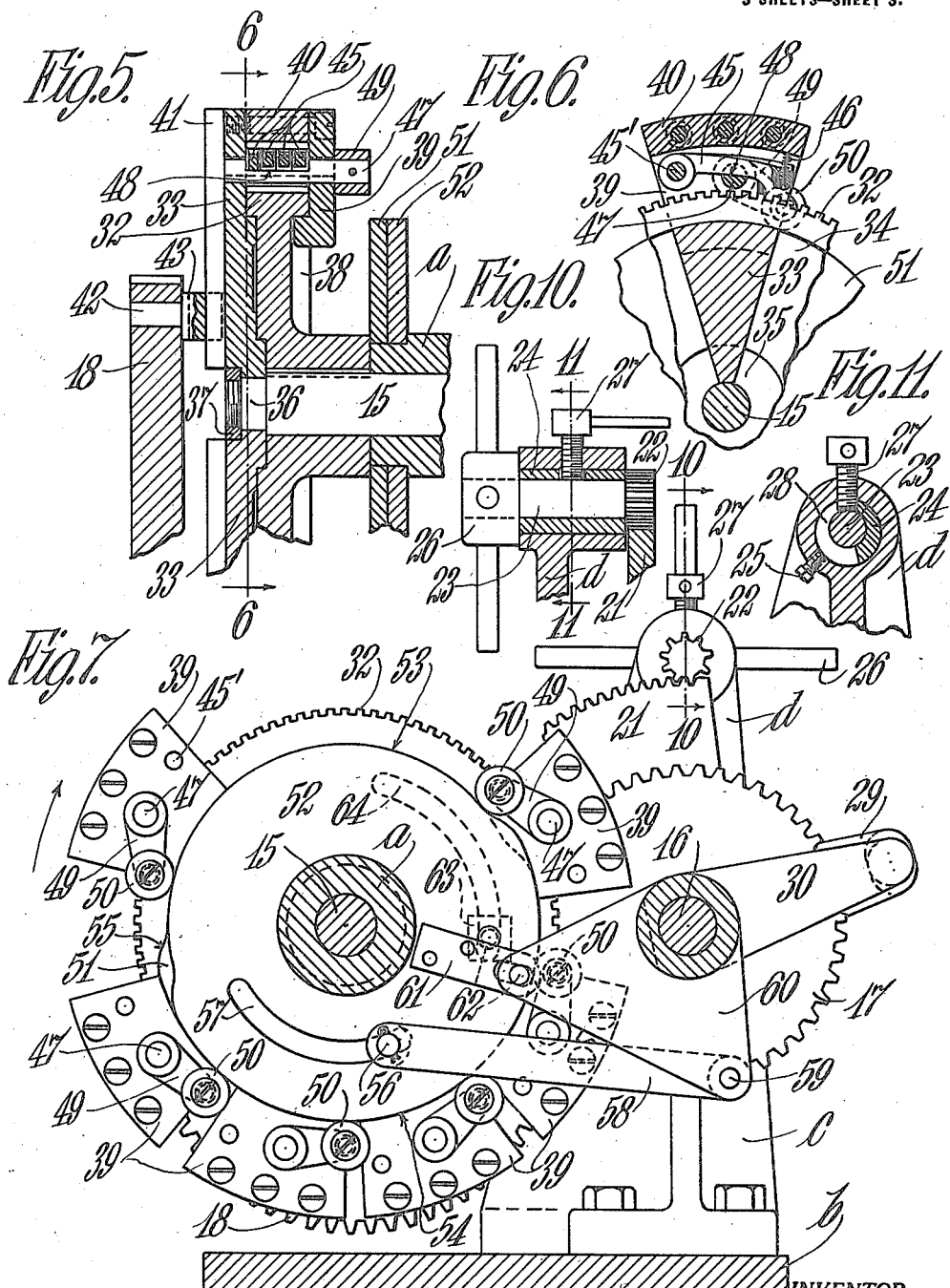

ELLSWORTH FREY, OF SPRINGFIELD, MASSACHUSETTS.

VARIABLE-SPEED TRANSMISSION.

1,263,546.  Specification of Letters Patent.  Patented Apr. 23, 1918.

Application filed October 2, 1916. Serial No. 123,298.

*To all whom it may concern:*

Be it known that I, ELLSWORTH FREY, a citizen of the United States of America, residing in Springfield, in the county of Hampden and State of Massachusetts, have invented certain new and useful Improvements in Variable-Speed Transmissions, of which the following is a specification.

This invention relates to improvements in variable speed transmissions.

The broad object of the invention is to provide a variable speed transmission wherein the driving and driven members are connected by positive as against frictional means and wherein the relative speed of said members may be varied without interrupting their movement.

Another object of the invention is to provide in a variable speed transmission a driving and a driven member, together with means connecting said members arranged to permit relative displacement thereof so that the axis of one may be moved above, below, or into coincidence with the axis of the other member, to vary the speed between the members.

Another object of the invention is to provide in a device of the class described, driving and driven members arranged for relative displacement so that the axis of one may be moved to either side of the axis of the other, and a series of devices operable successively to couple said members for a definite angular increment of movement thereof, whereby the driven member may be moved step by step, said devices arranged to overlap in their action so that the driven member may be turned continuously.

Other objects and advantages will appear in the description to follow and will be pointed out in the appended claims.

For the purposes of illustration, a preferred embodiment of the invention is shown in the accompanying drawings in which—

Figure 1 is a plan view of the transmission;

Fig. 2 is a front elevational view thereof;

Figs. 3 and 4 are sectional elevations taken on the lines 3—3 and 4—4, respectively, of Fig. 1;

Fig. 5 is a fragmentary cross-sectional view taken on the line 5—5 of Fig. 3;

Fig. 6 is a partial sectional elevation taken on the line 6—6 of Fig. 5;

Fig. 7 is a sectional elevation taken on the line 7—7 of Fig. 1;

Figs. 8 and 9 are detail sectional views taken on the lines 8—8 and 9—9, respectively, of Fig. 4;

Fig. 10 is a detail sectional view taken on the line 10—10 of Fig. 7; and

Fig. 11 is a cross-sectional view taken on the line 11—11 of Fig. 10.

Referring to these drawings in detail, reference numeral 15 indicates one end of a driving shaft which is suitably journaled in a bearing *a* mounted on base *b*. The end of a shaft 16, to be driven from shaft 15, is mounted in parallel relation to the latter in bearings *c* and *d* also fixed to base *a*. Fixed to shaft 16 is a gear 17 which meshes with a gear 18 suitably journaled in the end of a radius arm 19. The latter is loosely mounted on a necked down portion 20 of the hub of bearing *d* and is interposed between the latter and gear 17, as best shown in Fig. 1. Integral with arm 19 is an upwardly extending segmental gear 21 and in mesh with the latter is a pinion 22, the shaft 23 of which is rotatably mounted in the upper part of bearing *d*. The mounting of shaft 23 is best shown in Figs. 10 and 11 from which it will be seen that the shaft lies in an eccentric bushing 24 which is normally locked in position by any suitable means, such as a set screw 25, for example. By turning bushing 24, the teeth of pinion 22 may be moved relatively to the teeth in gear 21 to secure an exact meshing of the teeth or to allow adjustment for wear. Shaft 23 has fixed thereto a hand wheel 26 whereby the pinion 22 may be turned to raise or lower arm 19 in an obvious manner. A set screw 27 threaded into bracket *d* passes loosely through a slot 28 in bushing 24 to lock shaft 23 against movement. Arm 19 is further provided with an extension 29 which is adjustably connected by a bolt and slot connection (Figs. 1 and 2) to a lever 30 which is sleeved upon shaft 16 and extends between gear 17 and bearing C, as shown in Fig. 2. The function of lever 30 will later appear.

Fixed to the end of driving shaft 15 (Fig. 5) is a toothed wheel 32 which supports on the face adjacent to gear 18 a plurality of driving sectors 33. Each of the latter, as shown in Figs. 3 and 5, has a free sliding engagement with the outer face of wheel 32 and with the face and circumferential wall of each of two circular recesses 34 and 35 formed in the face of the wheel, as best shown in Fig. 3. The inner portion of each sector also has a bearing on a necked down portion 36 of shaft 15, and the several sectors are collectively held against axial displacement at their inner ends by a collar 37 threaded upon the end of shaft 15 (see Fig. 5). Engaging the rear face of wheel 32, as well as the face and circumferential wall of a circular recess 38 (Fig. 5) in the rear face thereof, and located behind each sector, is a gib 39. Interposed between each gib 33, is a spacer 40, the latter together with the gib and spacer being fastened together with screws, as shown in Figs. 5 and 6. Each sector 33 is furthermore formed with a central rib or slide 41 protruding outwardly toward gear 18. Loosely mounted in the latter and in concentrical relation therewith is a circular series of equidistantly spaced pins 42, one for each sector 33 (in the embodiment illustrated six pins with an angular spacing of sixty degrees are employed). Each pin has a head 43 protruding from one face of gear 18 toward the sectors, and these heads are slotted as best shown in Figs. 1 and 5 to engage and slide upon the ribs 41 of sectors 33.

Since the latter are freely revoluble on wheel 32 and since the heads 43 are freely slidable on ribs 41, a rotation of shaft 15 will not effect a turning of the driven shaft 16, and it is necessary to provide means whereby each sector may grip wheel 32. Furthermore, when the axis of gear 18 is out of alinement with shaft 15, as shown in the drawings, it is evident that all the sectors must not grip wheel 32 at the same time on account of the variation in angular movement which would be imparted to gear 18. Therefore, devices are provided to render inoperative the gripping means of each sector at certain periods, which devices as well as the gripping means will now be described. Referring to Figs. 5 and 6, each sector 33 has a series of pawls 45 (four in the embodiment illustrated) which are loosely mounted on a pin 45', and the ends of the latter are fixed in gib 39 and sector 33. Each pawl preferably has several teeth to engage wheel 32 and the pawls of each series are made progressively shorter in length (see Fig. 1) so that a slight angular movement of wheel 32 will cause one of the pawls to drop into a tooth space of the wheel. Springs 46 arranged between the pawls and the inner face of spacer 40 constantly force the former toward wheel 32.

Rotatably mounted in and extending between each gib 39 and sector 33 and arranged intermediate the axis and teeth of the pawls is a pin 47 which has a slabbed off surface 48 underlying the pawls. Fixed to each pin 47 is a crank 49 and rotatable in the free end thereof is a roll 50 (Fig. 7).

Rolls 50 ride upon the peripheries of two cam plates 51 and 52 arranged in contiguous relation and loosely mounted on the hub of bearing $a$ (see Fig. 5). When a roll 50 rides on the portions of plates 51 and 52 of smaller diameter the surface 48 is positioned as shown in Fig. 5 so that pawls 45 are free to engage wheel 32. When, however, the rolls ride upon the portions of larger diameter, pin 47 is turned and surface 48 forces the pawls upwardly and holds them out of engagement with wheel 32.

The peripheral surfaces of plates 51 and 52 are identically formed with concentric peripheral surfaces 53 and 54 connected by cam surfaces 55, the surfaces 54 being of greater diameter than the surfaces 53. Thus, with the plates positioned as in Fig. 7, there are two dwells of substantially equal extent upon which rolls 50 ride. Plates 51 and 52 may be shifted relatively to one another and, since rolls 50 are wide enough to engage both plates, such shifting will cause a decrease in the angular extent of the effective surface 53 for a purpose to appear. The means for shifting these plates will now be described. Riveted to plate 51 (Fig. 9) is a stud 56 which extends rearwardly through plate 52 and moves in an arcuate slot 57 formed in the latter. A link 58 on stud 56 is pivotally connected at 59 to a web 60 formed on lever 30 already described. A plate 61 riveted to plate 52 (see Fig. 8) is pivotally connected to web 60 at 62. Thus, as radius arm 19 is raised from the position shown in Fig. 1 by segmental gear 21, lever 30 is lowered, and web 60 turned to shift the plates 51 and 52 relatively to one another, so that the effective dwell surface 53 is decreased. Plates 51 and 52 are held together axially by a stud 63, riveted to plate 52 and moving in an arcuate slot 64 in plate 51, as shown in Figs. 4 and 8.

The operation of the transmission will now be described. Assuming the parts to be in the relative positions shown in the drawings, and that wheel 32 is rotating in the direction of the arrow in Fig. 2 under power applied to shaft 15, two of the sectors 33 will be driven therewith. It will be seen from Fig. 7 that the two uppermost sectors 33 are so positioned that the rolls 50 carried thereby ride on the dwell surface 53 of plates 51 and 52 so that the pins 47 are positioned as in Fig. 6, allowing one of the four pawls 45 of each series to engage wheel 32. One of the upper sectors 33 (that to the left as viewed in Fig. 7) has just come into action while the one to the right is just about to go out of action. Thus, each sector comes successively into play for a definite angular step equal to the angular extent of the effective dwell surface 53 and, as has just been seen, one sector becomes connected to wheel 32 just before the preceding one becomes disconnected so that there is always one sector in action and at no time more than two. The sectors turn gear 18 through the blocks 43 and each sector moves the gear a definite angular step which may be greater, less, or equal to the angular movement of the sector. With the parts positioned as shown in the drawings, it will be seen that the arc of effective movement of each sector 33 subtends a greater central angle on wheel 32 than on gear 18, with the result that gear 18 is turned at a slower rate than wheel 32. For example, with the parts positioned as shown in Fig. 2, each sector is driven by wheel 32 for an angular step of substantially 120° while gear 18 is turned but 60° by the sector. The action may be readily seen from Fig. 2, by drawing from the center of each of the two upper pins 42 a line radial to the center of shaft 15 and a line radial to the center of gear 18, and, if it be assumed that the arc between these two pins 42 represents the angular extent of movement of sectors 33 (which it does approximately), the angle between the shorter pair of radial lines represents the extent of movement of wheel 32 and that between the longer pair the extent of movement of gear 18, the latter angle being substantially one-half the former. Now assuming that arm 19 is raised, so that the axes of gear 18 and wheel 32 come into substantial coincidence, the gear and wheel will rotate at equal speed since the central angles subtended by the arc of effective movement of sectors 33 are equal, and, when gear 18 is raised above the axis of wheel 32, it will be seen that the former will rotate more rapidly than the wheel.

It is recognized that uniform rotation of wheel 32 does not produce by the action described exact uniform rotation of gear 18, except when the axes of the driving and driven members coincide. There would be, for example, a wide variation if the sectors were allowed to drive gear 18 while in their lower travel, as is evidenced by the bunching of the lower sectors shown in Fig. 3. There is an angular range, however, wherein the gear 18 may be driven by the action described at a substantially uniform rate, and this range is that in which the sectors 33 are allowed to engage wheel 32. For example, if the travel of a pin 42 be plotted by steps from the start to the end of its effective driving travel, it will be found that for equal steps of movement of wheel 32, the steps of pin 42 are not absolutely equal, but they are, however, approximately so, and the variations are so slight as not to affect the practical utility of this form of transmission. As the axis of gear 18 is raised from the position shown, the range wherein substantially uniform motion of the gear can be obtained decreases, and for this reason the effective dwell surface 53 is automatically decreased by the relative shifting of plates 51 and 52 by movement of radius arm 19. A further reason for decreasing the effective surface 53 is to prevent more than two sectors from becoming operatively connected to wheel 32 at the same time for, as the gear 18 is raised, the upper sectors come much closer together and do not fan out to the extent shown in Fig. 2.

The transmission described has the important advantage of permitting speed variation without stopping the driver. Power may be transmitted continuously while the speed of the driven element is varied from a maximum to a minimum, and the speed may be varied by as small steps as desired. The speed variation obtained has the advantageous characteristics of belt connected conical pulleys and friction drives without their disadvantages for, with the arrangement described, there is always a positive, non-slipping connection between the driving and driven elements.

It is recognized that modifications may be made in the specific structure herein described for illustrative purposes without departing from the scope of the invention which is defined by the appended claims rather than by the foregoing description of one preferred form.

What I claim is—

1. A variable speed transmission, comprising, in combination, driving and driven elements arranged for relative and substantially radial displacement, means positively coupling said elements for an operable driving engagement in either direction, and means to effect said displacement without interrupting the connection of said elements or the movement thereof, all constructed and arranged so that a given angular movement of one element may effect a greater, smaller, or equal movement of the other element.

2. A variable speed transmission, comprising, in combination, a driving and a driven member, devices operably connecting said members so that the one may drive the other in either direction and arranged to permit relative displacement of the members so that the axis of one may be moved to either side of or into substantial coincidence with the axis of the other, all constructed and arranged so that a given angular movement of one member may produce a greater, equal, or smaller movement of the other member.

3. A variable speed transmission, comprising, a driving and driven element arranged face to face in adjacent relation, means to move said elements substantially radially relatively to one another so that the axis of one may be positioned on either side of or into substantial coincidence with the other, and devices to couple said elements in a positive engagement for forward or reverse drive, said devices being automatically and radially adjustable by the operation of said means, all constructed and arranged so that by shifting the axes of said elements relatively to one another a variation in their relative speed may be obtained.

4. A variable speed transmission, comprising, in combination, a driving and a driven element arranged face to face in adjacent relation, means to move said elements relatively to one another in a substantially radial direction, a series of devices rotatable with one element and radially slidable with respect to the other of said elements, and mechanism to successively connect each device to said other element for a given angular movement thereof, whereby the driven element may be moved by a series of steps, said devices arranged to act in overlapping relation whereby the driven element may be moved continuously.

5. A variable speed transmission, comprising, in combination, a driving and a driven member arranged face to face in adjacent relation, means to move one member substantially radially with respect to the other member so its axis may be positioned on either side of or in line with the axis of the other member, a series of devices rotatably mounted on one of said members and formed with radial slides, a circular series of pins rotatable in the other member and having parts to engage with and move on said slides, gripping means in each device adapted to lock the latter to its supporting member, and mechanism to control the gripping means so that each device becomes successively connected to its member to turn therewith for a given angular step, and becomes disconnected after a succeeding device becomes connected, all constructed and arranged so that the driving turns the driven member continuously and so that the axes of said members may be relatively shifted to vary the speed of the driven member.

6. A variable speed transmission, comprising, in combination, a driving and a driven member mounted face to face in adjacent relation, means to move said members relatively to one another in a substantially radial direction so that the axis of one may be moved from a position of coincidence with to positions on either side of the axis of the other member, a series of devices adapted to connect said members, each having a free sliding engagement in a radial direction with one member, and being normally free to rotate relatively to the other member, means to successively connect each device to the last-named member to turn therewith for a given angular step, and means to successively disconnect each device after a preceding device has been connected, all constructed and arranged so that the driving member may continuously rotate the driven member and permit relative displacement of the axes of said members.

7. A variable speed transmission, comprising, in combination, a driving and a driven member mounted face to face in adjacent relation, means to move said members relatively to one another in a substantially radial direction so that the axis of one may be moved from a position of coincidence with to positions on either side of the axis of the other member, a series of devices adapted to connect said members, each having a free sliding engagement in a radial direction with one member and being normally free to rotate relatively to the other member, means to successively connect each device to the last-named member to turn therewith for a given angular step, and means to successively disconnect each device after a preceding device has been connected, and mechanism automatically operable to vary the length of said angular step as the axes of said members are relatively shifted, all constructed and arranged so that the driving member may continuously rotate the driven member and permit relative displacement of the axes of said members.

8. A variable speed transmission, comprising, a driving and a driven shaft mounted in parallel relation, a wheel fixed to the driving shaft, a radius arm loose on the driven shaft and substantially equal in length to the distance between said shafts, a member mounted in the end of said arm and rotatable from the driven shaft, said member arranged adjacent said wheel and adapted to be turned thereby, means to swing said arm to shift the axis of said member from a position of substantial coincidence with to positions on either side of the axis of the driving shaft, a circular series of pins rotatable in said member and having fork shaped portions projecting toward said wheel, a series of devices carried by and normally rotatable relatively to said wheel, said devices formed with radial slides to receive said portions, gripping means in each device adapted to lock the latter to said wheel, mechanism to control the gripping means so that each device may be successively connected to the wheel and disconnected therefrom after it has moved a definite angular step and after a succeeding device becomes connected to the wheel, and means operable by movement of the radius arm to vary the extent of said angular step.

ELLSWORTH FREY.